(12) United States Patent
Lev

(10) Patent No.: US 9,914,133 B2
(45) Date of Patent: Mar. 13, 2018

(54) AIR PURIFIER

(71) Applicant: FKA Distributing Co., LLC, Commerce Township, MI (US)

(72) Inventor: Mordechai Lev, West Bloomfield, MI (US)

(73) Assignee: FKA Distributing Co., LLC, Commerce Township, MI (US)

( * ) Notice: Subject to any disclaimer, the term of this patent is extended or adjusted under 35 U.S.C. 154(b) by 215 days.

(21) Appl. No.: 14/644,755

(22) Filed: Mar. 11, 2015

(65) Prior Publication Data

US 2015/0182976 A1  Jul. 2, 2015

Related U.S. Application Data

(63) Continuation of application No. 13/605,036, filed on Sep. 6, 2012, now Pat. No. 9,005,347.

(Continued)

(51) Int. Cl.
| | |
|---|---|
| *B03C 3/40* | (2006.01) |
| *B03C 3/011* | (2006.01) |
| *B03C 3/12* | (2006.01) |
| *B03C 3/32* | (2006.01) |
| *B03C 3/36* | (2006.01) |
| *B03C 3/41* | (2006.01) |
| *B03C 3/53* | (2006.01) |
| *B03C 3/82* | (2006.01) |

(52) U.S. Cl.
CPC ............... *B03C 3/40* (2013.01); *B03C 3/011* (2013.01); *B03C 3/12* (2013.01); *B03C 3/32* (2013.01); *B03C 3/368* (2013.01); *B03C 3/41* (2013.01); *B03C 3/53* (2013.01); *B03C 3/82* (2013.01); *B03C 2201/10* (2013.01)

(58) Field of Classification Search
CPC .... B03C 3/40; B03C 3/82; B03C 3/53; B03C 3/41; B03C 3/368; B03C 3/011; B03C 3/12; B03C 3/32; B03C 2201/10
See application file for complete search history.

(56) References Cited

U.S. PATENT DOCUMENTS

| 1,639,132 | A | * | 8/1927 | Greene | ................ F02M 35/024 55/487 |
| 2,582,273 | A | * | 1/1952 | Peterson | .............. B01D 33/067 210/404 |

(Continued)

FOREIGN PATENT DOCUMENTS

| CN | 1038414 A | 1/1990 |
| CN | 201145379 Y | 11/2008 |

(Continued)

OTHER PUBLICATIONS

Humanair, Personal Zone Air Purifier, Humanscale brochure, 5 pages.

*Primary Examiner* — Amber R Orlando
*Assistant Examiner* — Stephen Hobson
(74) *Attorney, Agent, or Firm* — Brooks Kushman P.C.

(57) ABSTRACT

An electrostatic precipitator for an air purifier includes a first spiral strip having a continuous conductive electrode, a second spiral strip having a continuous conductive electrode and nested with the first strip, a plurality of combs. Each comb extends from an outer periphery of the precipitator to an intermediate region between the outer periphery and a center of the precipitator.

19 Claims, 8 Drawing Sheets

Related U.S. Application Data

(60) Provisional application No. 61/532,740, filed on Sep. 9, 2011.

(56) References Cited

U.S. PATENT DOCUMENTS

| | | | |
|---|---|---|---|
| 2,908,348 A | 10/1959 | Rivers et al. | |
| 2,926,749 A | 3/1960 | Oswald | |
| 3,412,530 A | 11/1968 | Cardiff | |
| 3,416,540 A | 12/1968 | Lidums | |
| 3,841,840 A | 10/1974 | Hundhausen et al. | |
| 3,976,448 A | 8/1976 | Eng et al. | |
| 4,234,324 A | 11/1980 | Dodge, Jr. | |
| 4,268,282 A | 5/1981 | MacKenzie | |
| 4,313,741 A * | 2/1982 | Masuda | B03C 3/12 96/78 |
| 4,342,571 A | 8/1982 | Hayashi | |
| 4,344,776 A | 8/1982 | Yavnieli | |
| 4,354,861 A | 10/1982 | Kalt | |
| 4,477,268 A | 10/1984 | Kalt | |
| 4,627,862 A | 12/1986 | Frei et al. | |
| 4,812,711 A | 3/1989 | Török et al. | |
| 4,853,005 A | 8/1989 | Jaisinghani et al. | |
| 4,944,778 A | 7/1990 | Yanagawa | |
| 4,955,991 A | 9/1990 | Török et al. | |
| 4,967,119 A | 10/1990 | Török et al. | |
| 4,976,752 A | 12/1990 | Török et al. | |
| 5,006,761 A | 4/1991 | Török et al. | |
| 5,012,159 A | 4/1991 | Török et al. | |
| 5,024,685 A | 6/1991 | Török et al. | |
| 5,053,912 A | 10/1991 | Loreth et al. | |
| 5,077,500 A | 12/1991 | Török et al. | |
| 5,180,404 A | 1/1993 | Loreth et al. | |
| 5,198,003 A | 3/1993 | Haynes | |
| 5,529,613 A | 6/1996 | Yavnieli | |
| 5,766,318 A | 6/1998 | Loreth et al. | |
| 5,779,769 A | 7/1998 | Jiang | |
| 5,980,614 A | 11/1999 | Loreth et al. | |
| 5,982,102 A | 11/1999 | Andrzej | |
| 5,993,521 A | 11/1999 | Loreth et al. | |
| 6,117,216 A | 9/2000 | Loreth | |
| 6,203,600 B1 | 3/2001 | Loreth | |
| 6,361,589 B1 | 3/2002 | Loreth | |
| 6,391,097 B1 | 5/2002 | Rosenberg | |
| 6,398,852 B1 | 6/2002 | Loreth | |
| 6,471,746 B2 | 10/2002 | Hagglund et al. | |
| 6,488,731 B2 | 12/2002 | Schultheiss et al. | |
| 6,524,488 B1 | 2/2003 | Insley et al. | |
| 6,749,669 B1 | 6/2004 | Griffiths et al. | |
| 6,918,951 B2 | 7/2005 | Rosenberg | |
| 7,014,688 B2 | 3/2006 | Griffiths et al. | |
| 7,081,155 B2 | 7/2006 | Loreth | |
| 7,222,612 B2 * | 5/2007 | Hagler | F02M 25/0854 123/516 |
| 8,523,983 B2 | 9/2013 | Loreth | |
| 2004/0182243 A1 | 9/2004 | Loreth | |
| 2007/0145166 A1 | 6/2007 | Loreth | |
| 2007/0240571 A1 | 10/2007 | Loreth | |
| 2011/0171075 A1 | 7/2011 | Loreth | |

FOREIGN PATENT DOCUMENTS

| | | |
|---|---|---|
| CN | 201145385 Y | 11/2008 |
| DE | 293637 A5 | 5/1991 |
| FR | 1400684 A | 5/1965 |
| HU | 203620 B | 6/1985 |
| PL | 153456 | 9/1991 |
| SE | 9602210 | 1/1998 |
| SE | 513603 C2 | 10/2000 |
| SE | 0200557 | 9/2003 |
| WO | 8803057 A1 | 5/1988 |
| WO | 9205875 A1 | 4/1992 |
| WO | 9604703 A1 | 2/1996 |
| WO | 9611060 A1 | 4/1996 |
| WO | 2006062548 A1 | 6/2006 |

* cited by examiner

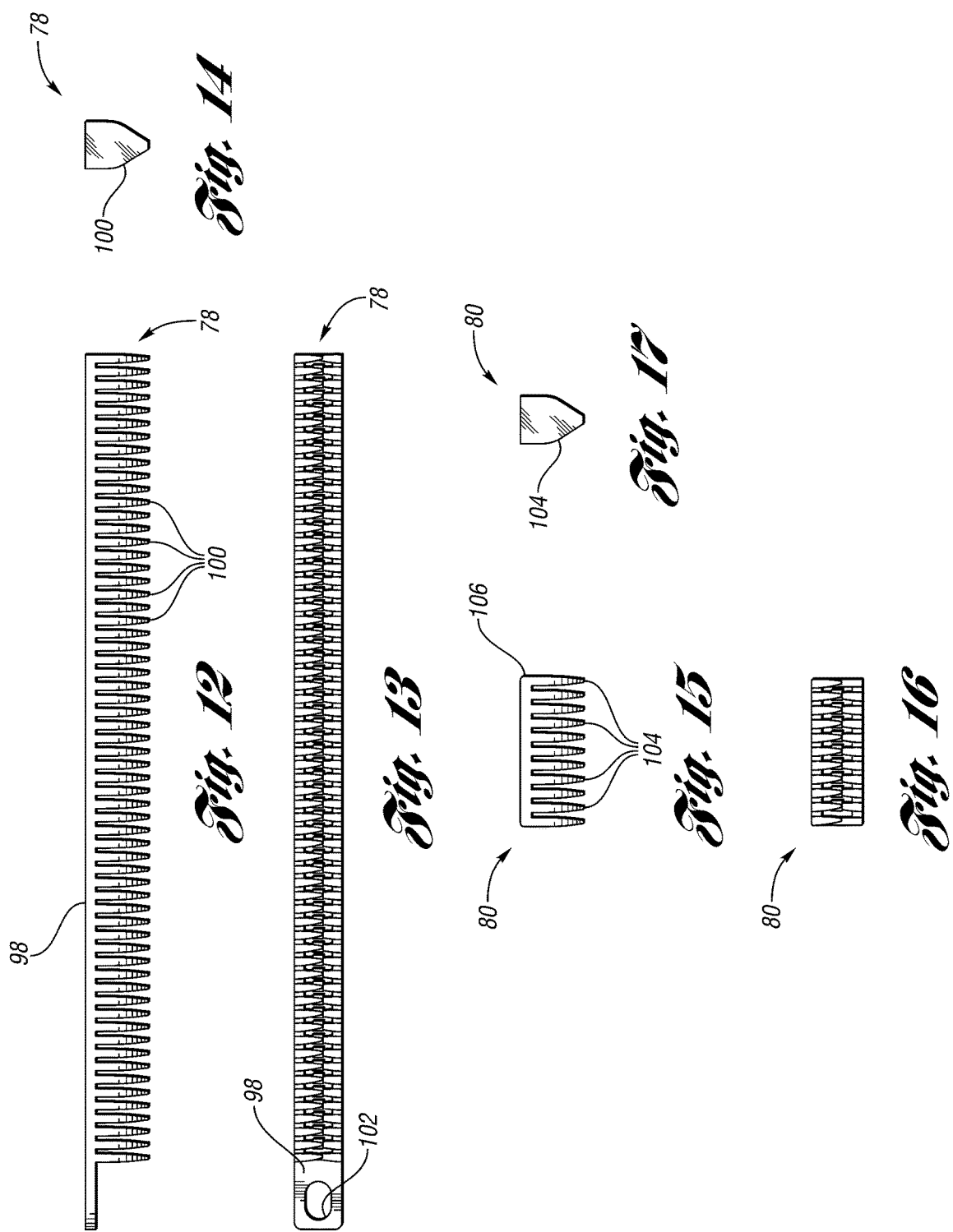

AIR PURIFIER

CROSS-REFERENCE TO RELATED APPLICATIONS

This application is a continuation of U.S. application Ser. No. 13/605,036 filed Sep. 6, 2012, now U.S. Pat. No. 9,005,347 B2, which, in turn, claims the benefit of U.S. provisional application Ser. No. 61/532,740 filed Sep. 9, 2011, the disclosures of which are hereby incorporated in their entirety by reference herein.

TECHNICAL FIELD

Various embodiments relate to an electrostatic air purifier.

BACKGROUND

Indoor air quality may affect individuals including those with asthma, allergies, and other health concerns. Air contains particulate matter such as dust, pollen, soot, and the like, which may be on the order of microns or smaller. By removing the particulate matter, or particles, from the air, indoor air quality may be improved. A portable air purifier removes particulate matter from an airstream and may be used in residential, office, and other environments. The purifier may be moved from room to room, or area to area, as needed.

SUMMARY

In an embodiment, an air purifier is provided with a frame, a fan unit supported by the frame, and an electrostatic precipitator. The electrostatic precipitator has a first strip with first and second opposing surfaces and first and second opposing edges. A first continuous conductive electrode layer extends along a portion of one of the first and second surfaces and directly adjacent to one of the first and second edges of the first strip. The electrostatic precipitator also has a second strip with first and second opposing surfaces and first and second opposing edges. A second continuous conductive electrode layer extends along one of the first and second surfaces and directly adjacent to one of the first and second edges of the second strip. The first and second strips are nested with one another. The one of the first and second edges of the first strip is opposed to the one of the first and second edges of the second strip.

In another embodiment, an electrostatic precipitator for an air purifier is provided with a first spiral strip having a continuous conductive electrode, a second spiral strip having a continuous conductive electrode and nested with the first strip, and a plurality of combs. Each comb extends from an outer periphery of the precipitator to an intermediate region between the outer periphery and a center of the precipitator.

In yet another embodiment, an air purifier is provided with a frame, an electrostatic precipitator supported by the frame, and a fan unit supported by the frame and positioned downstream of the electrostatic precipitator, the fan unit configured to flow air through the air purifier. The electrostatic precipitator is configured to provide electrostatic forces to remove particles from air flowing through the air purifier. The electrostatic precipitator has a first strip with a continuous conductive electrode layer along a surface of the strip and directly adjacent to an edge of the strip. The electrostatic precipitator has a second strip nested with the first strip. The second strip has a continuous conductive electrode layer along a surface of the strip and directly adjacent to an edge of the strip. The edge of the second strip is opposed to the edge of the first strip. The electrostatic precipitator also has a plurality of combs. Each comb has a support bar and teeth configured to separate adjacent strips.

Various embodiments of the present disclosure have associated non-limiting advantages. For example, the combs provide for mechanical separation between electrostatic layers in the electrostatic precipitator. The combs also provide for fixed spacing between the layers of the electrostatic precipitator, which in turn may provide for improved collection of particles with more uniform electrical forces on air flowing between the layers and through the precipitator. The combs provide for consistent and precise spacing between the strips. The fixed spacing may also provide more uniform air flow through the precipitator and reduce turbulence. Also, the combs may provide for ease of manufacture as the teeth may be inserted between the layers, opposed to an adhesive method where the layers need to be appropriately spaced and kept in that position while the adhesive is applied and sets. The conductive ink being on opposed edges of adjacent layers may provide for increased distance between the electrical fields generated by the conductive ink, and improved control over the electrical fields and reduced interference between the fields generated by the conductive ink on the two layers.

BRIEF DESCRIPTION OF THE DRAWINGS

FIG. 12 is a side view of a comb for use with the electrostatic precipitator of FIG. 5;

FIG. 13 is a bottom view of the comb of FIG. 12;

FIG. 14 is an end view of the comb of FIG. 12;

FIG. 15 is a side view of another comb for use with the electrostatic precipitator of FIG. 5;

FIG. 16 is a bottom view of the comb of FIG. 15; and

FIG. 17 is an end view of the comb of FIG. 15.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
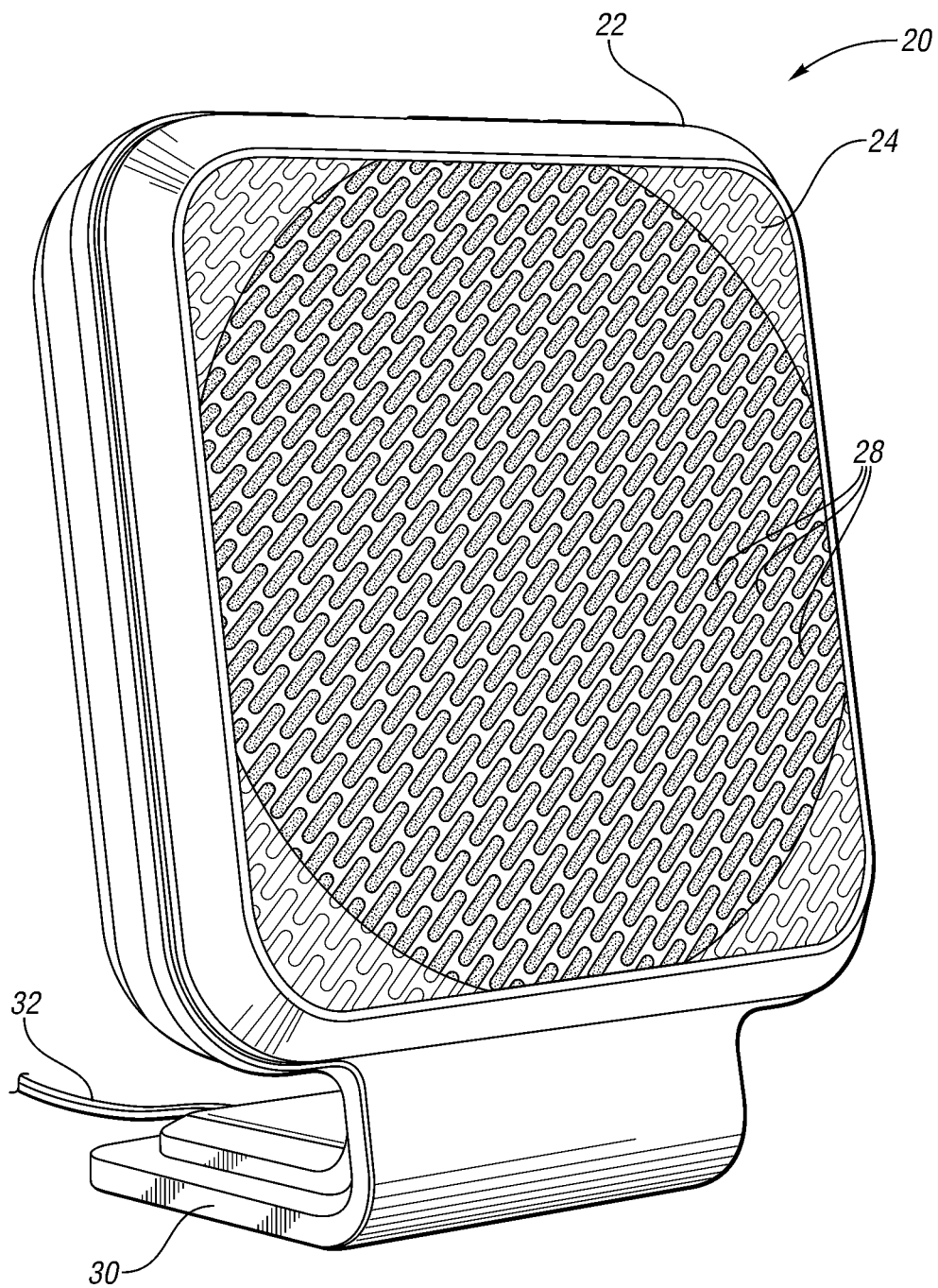
FIG. 1 is a front perspective view of an air purifier according to an embodiment.
Figure 2:
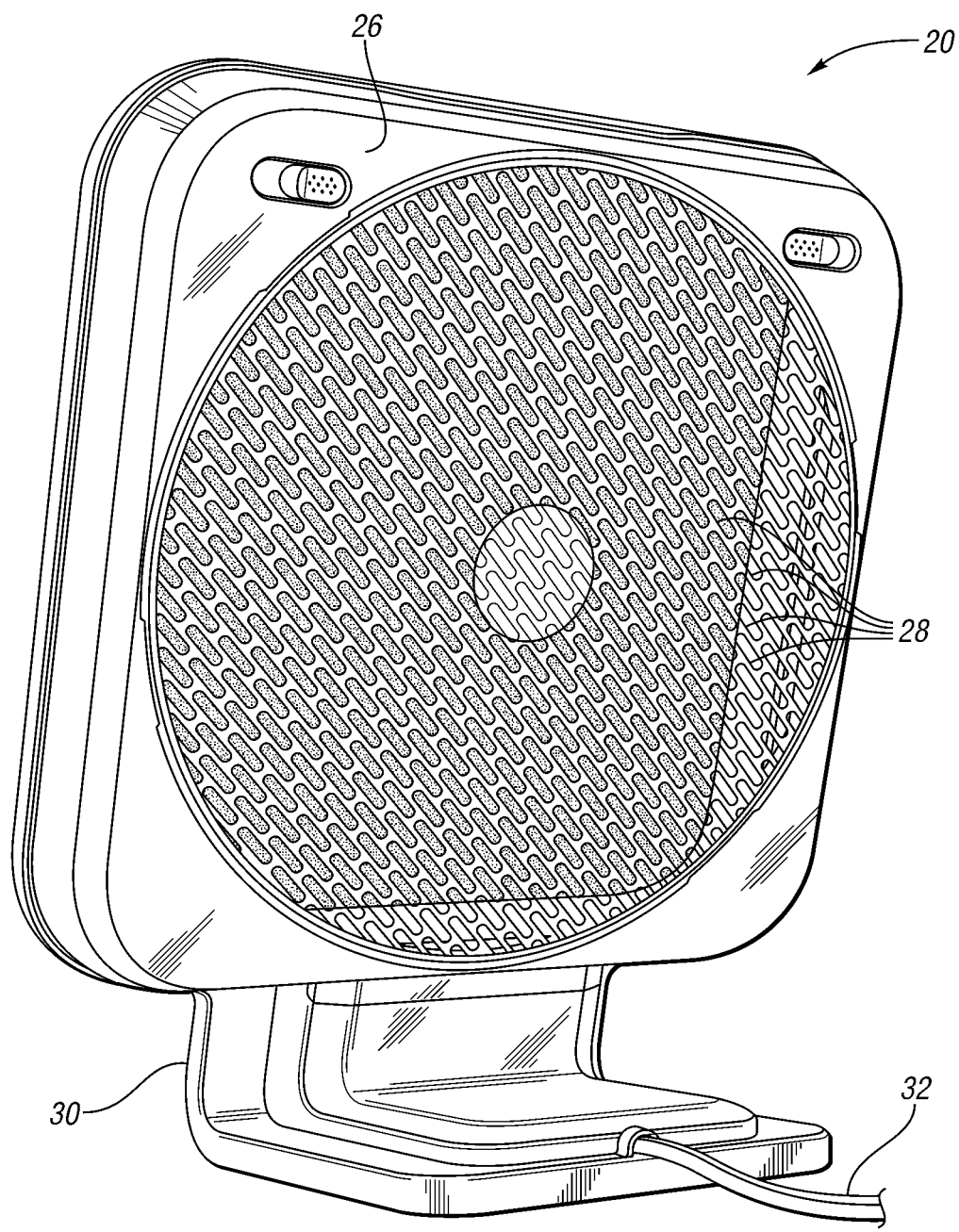
FIG. 2 is a rear perspective view of the air purifier of FIG. 1.

FIGS. 1 and 2 illustrate an air purifier 20 capable of electrostatic precipitation of particulate matter, or particles, from the ambient air. The air purifier 20 has a cover 22 or enclosure which may contain a front portion 24 and a back portion 26. The cover 22 may contain apertures 28 such as holes, perforations, or slots in the front cover 24 and back cover 26 to allow air to flow through the unit 20, and be purified by an electrostatic precipitator contained within the unit 20. A base 30 supports the unit 20 on an underlying surface, such as a tabletop, floor, or the like. Other bases are also contemplated for use with the air purifier 20. The air purifier 20 has an electrical power cord 32 which allows the unit 20 to be plugged into a wall electrical outlet to supply the purifier with electricity. Alternatively, the unit 20 may contain a compartment for batteries or an alternate power source to provide the unit 20 with stand-alone power.

Figure 3:
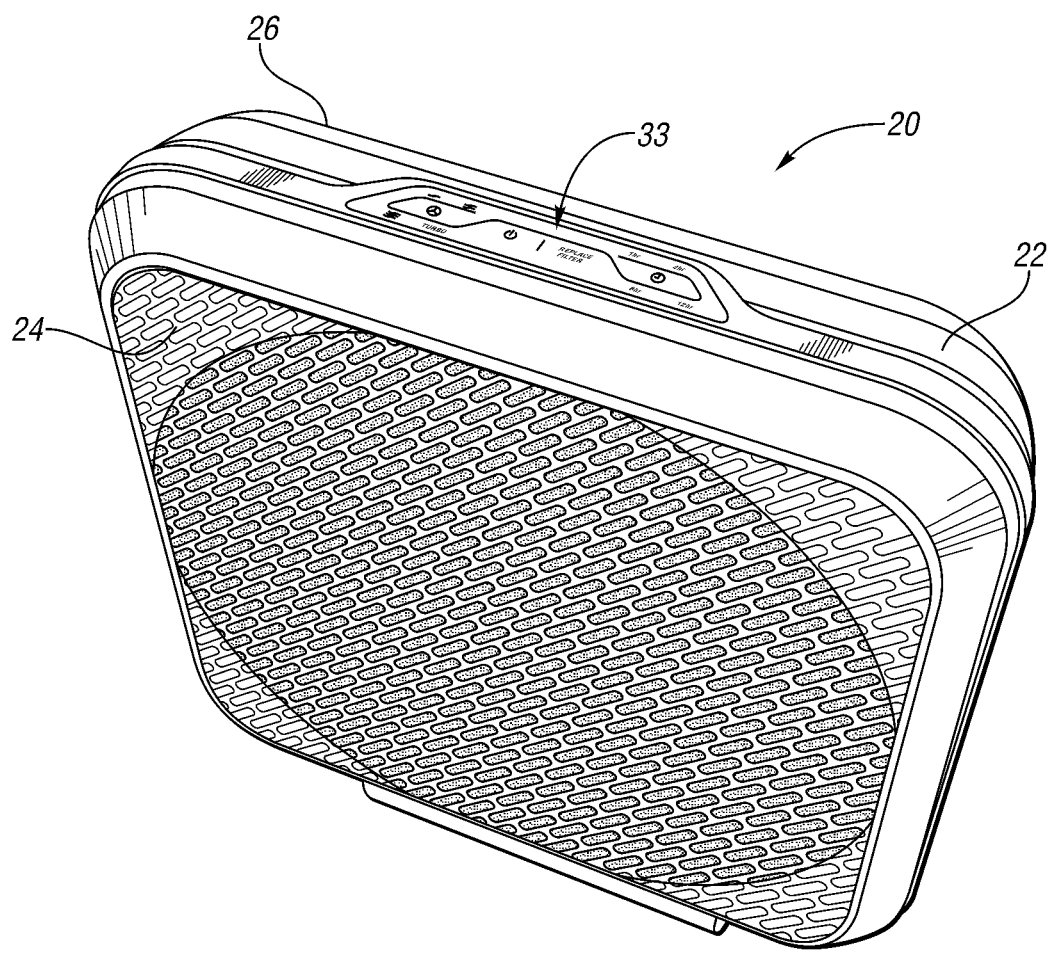
FIG. 3 is a top perspective view of the air purifier of FIG. 1.

FIG. 3 illustrates a top perspective view of the air purifier showing a user interface panel 33. The user interface panel 33 provides one or more inputs or controls for a user to control the air purifier 20. For example, the air purifier may be equipped with a power button, a fan speed control button or dial, a timer such that the air purifier turns off after a designated time such as one hour, two hours, four hours, etc. The user interface may also contain lights, such as light emitting diodes, that act to provide information to the user, such as for changing a filter component of the purifier 20.

Figure 4:
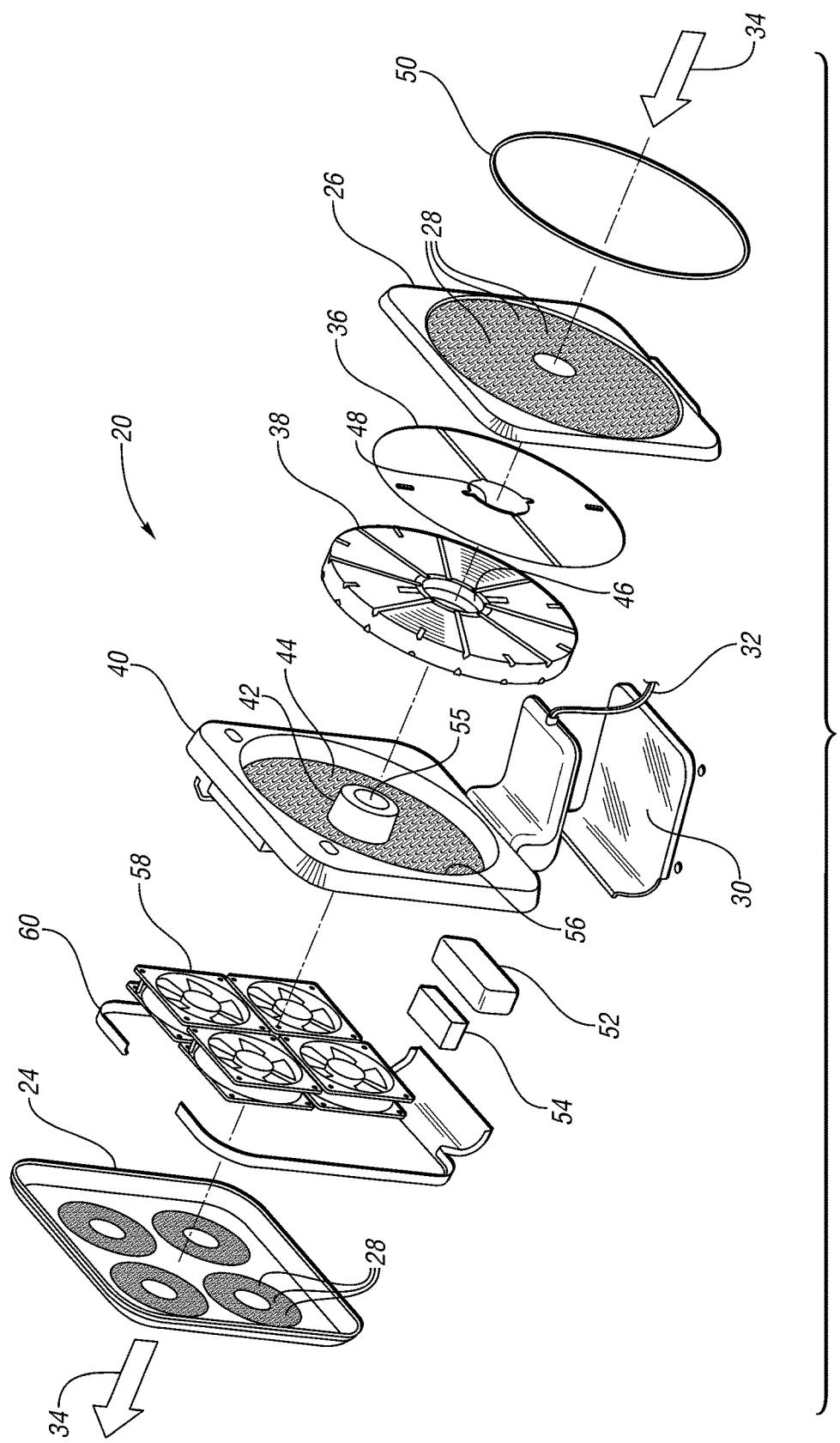
FIG. 4 is an exploded view of the air purifier of FIG. 1.

FIG. 4 is an exploded view of the air purifier 20. The air flow 34 is shown as flowing from the ambient environment, through the unit 20 entering at the back cover 26 and exiting at the front cover 24 out of the unit 20 as purified air. Although the present disclosure describes the air flow as from the back cover 26 to the front cover 24, the direction is not meant to be limiting. For example, the purifier 20 may also be configured such that the air flows in the opposing direction from the front cover 24 to the back cover 26.

The air flow 34 enters through perforations 28 in the back cover 26. The air then proceeds to flow through a pre-filter 36. The pre-filter 36 removes large particles and matter from the air stream 34 before the air flows through the electrostatic precipitator 38. The pre-filter 36 may be made from a paper, mesh material, screen, or other material as is known in the art to remove larger particles or other matter.

The air then flows from the pre-filter 36 and into the electrostatic precipitator 38, which is in electrical communication with the power cord 32. The electrostatic precipitator 38 creates electrostatic forces within the precipitator 38 such that particles are removed from the air flow 34 and deposited onto the surface of the precipitator 38. The particles may have been charged or partially charged by a corona discharge or electrical field created by metal ring 50 and electrode or ionizer 55. The electrostatic precipitator 38 removes at least a portion of particulate matter contained in the air stream 34. In one example, the electrostatic precipitator 38, which is located downstream of the pre-filter 36, provides electrostatic forces to attract particles on the order of down to 0.01 microns or down to 0.1 microns.

A frame 40 is connected to the base 30 and acts to support the various components of the unit 20. The frame 40 has a support member 42 surrounded by a recessed area 44. The support member 42 and recessed area 44 are sized to receive and support the electrostatic precipitator 38 and the pre-filter 36. The electrostatic precipitator 38 has an aperture 46 which fits over and is supported by the support member 42. The electrostatic precipitator 38 may have clips on an inner surface of the aperture 46 that align with corresponding clips on the support member 42 to secure or retain the precipitator 38 to the support member 42. The clips on the precipitator 38 and the support member 42 may also act to provide electricity to the conductive ink electrodes 64, 68. The pre-filter 36 also has an aperture 48 which fits over and is supported by the support member 42.

The back cover 28 attaches to the frame 40 to retain the electrostatic precipitator 38 and pre-filter 36 within the recessed area 44 of the frame 40. A metal conductive ring 50 may be provided on the back cover 26 and be electrically connected or in electrical communication with an electrical ground or one of the power supplies 52, 54. The back cover 26 is connected to the frame 40 using fasteners such as clips, screws, or other fasteners as are known in the art. On some embodiments, the back cover 26 is designed to be removable by a user to replace or clean the pre-filter or electrostatic precipitator as necessary.

A power supply 52 and a high voltage power supply 54 are connected to one of the frame 40 and the base 30. Electricity flowing through the power cord 32 enters the main power supply 52, which is in electrical communication with the high voltage power supply 54. The high voltage power supply 54 increases the voltage for use with the electrostatic precipitator 38. Electrical connections on the support member 42 transfer electricity from the high voltage power supply 54 to the electrostatic precipitator 38 to create the electrostatic forces. Of course, other locations for electrical connections between the high voltage power supply 54 and the electrostatic precipitator 38 are also contemplated.

An ionizer brush 55 or electrode is connected to the support member 42 and ionizes ambient air. The ionizer brush 55 may extend through an aperture in the cover 26 such that it extends outside the unit 20. The ionizer brush 55 may introduce ions into the ambient air or into the air stream 34 to offset ozone or NOx created by the electrostatic precipitator 38. The ionizer brush 55 is connected to the power supply 52 or the high voltage power supply 54. In some embodiments, the ring 50 acts as a ground for the ionizer brush 55 to prevent corona discharge and arcing and also to prevent ozone formation. The ring 50 and ionizer brush 55 may additionally act to charge or partially charge the particles before they reach the precipitator.

A series of apertures, perforations, or holes 56 are provided within the recess area 44 of the frame 40. The apertures 56 allow airflow from the electrostatic precipitator 38 and through the frame 40. The air is drawn through the unit 20 by a fan unit 58. The fan unit 58 is shown as having four fans arranged in an array; however, any number of fans are contemplated for use with the unit 20. Power to the fan unit 58 is provided by the power supply 52. The fan unit 58 is attached to the frame 40 using fasteners as is known in the art.

Trim 60 may be provided with the unit 20 to connect the frame 40 to the front cover 24 and provide spacing for the fans 58. The front cover 24 connects to the trim 60, or alternatively, directly to the frame 40 using fasteners such as clips, screws, or other fasteners as are known in the art.

The front cover 24 has a series of apertures 28 which permit the air stream 34 to exit the unit 20 and provide purified or cleaned air to the ambient environment. The apertures 28 may be patterned such that they are in line with the fans in the fan unit 58, as is shown in FIG. 4. Alternatively, the apertures 28 may extend over a majority of the front cover 24.

As is shown in FIG. 4, the air flow goes through the pre-filter 36 and the electrostatic precipitator 38 before flowing through the fan unit 58 and out of the unit 20. Therefore, the filtering units 36, 38 are located upstream of the fan unit 58.

Figure 5:
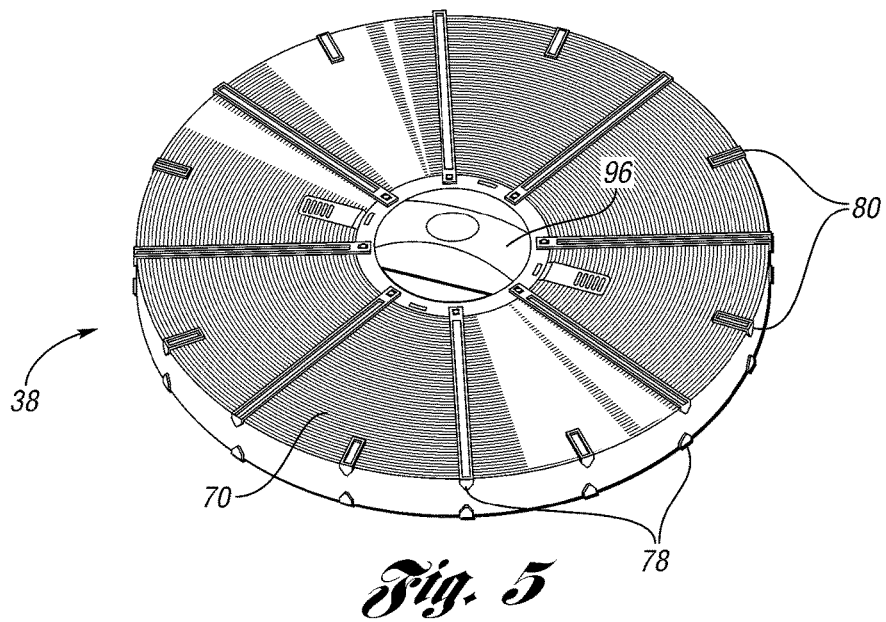
FIG. 5 is a perspective view of an electrostatic precipitator according to an embodiment.
Figure 8:
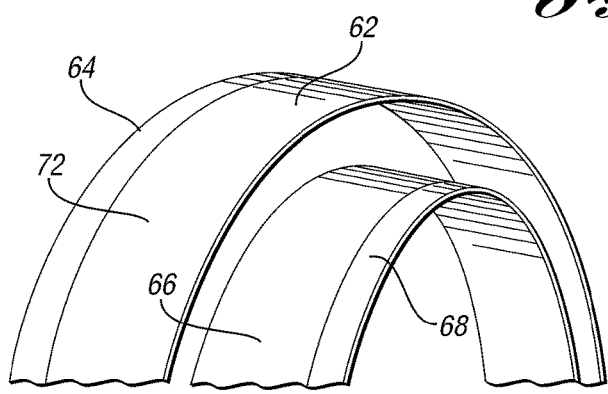
FIG. 8 is a schematic of a pair of electrostatic precipitator layers.

The electrostatic precipitator 38 is shown in FIG. 5. The electrostatic precipitator 38 is made from two concentric nested spiral layers or strips. A section of the two layers is shown in FIG. 8. The layers or strips may be made from paper, cloth, or other non-conductive material. In one embodiment, the layers include paper fiber, wood pulp, and CaCO3. The first layer 62 has a stripe or layer of conductive ink 64 located along and directly adjacent to an edge of the layer 62 and on one side of the layer 62. The second layer 66 has another stripe of conductive ink 68. The ink 68 is located along and directly adjacent to the edge of the layer 66 and on one side or one surface of the layer 66. The ink stripes 64 and 68 are located on opposing edges of the layers 62, 66, respectively. The conductive ink stripes 64, 68 act as electrodes and create an electrical field to charge or attract particles in the nearby air flowing past the layers.

In one embodiment, described with respect to FIG. 8, each layer 62, 66 has a pair of sides or surfaces and a pair of edges. Each side of a layer 62, 66 is approximately 25 mm. Each edge is approximately 0.35-0.50 mm based on whether the measurement is taken before or after compression of the layer. The ink 64, 68 is positioned on a side of the respective layer 62, 66 and directly adjacent to an edge of a layer. The ink is approximately 3 mm in width and 0.02 mm in thickness on the layer. The dimensions of the layers 62, 66 and the ink 64, 68 provide for spacing between the two ink stripes 64, 68 of more than five times, or even more than six times the width of an ink stripe 64, 68 between adjacent layers.

Referring back to FIG. 5, the precipitator unit 38 is made from the first and second layers 64, 66 wound into a concentric nested spiral 70. The layers 64, 66 are wound such that every other layer within the spiral 70 has the conductive ink on the same edge or side of the spiral 70. The ink stripe runs continuously along the entire length of each layer and is directly adjacent to the edge of the layer. In one embodiment, each layer is approximately 20 meters in length, 25 millimeters in width, and 0.35 millimeters in thickness. In some embodiments, the conductive electrode is an ink stripe which is 3 millimeters wide and 0.2 millimeters in thickness. The ink is made from a conductive material applied on one side or one surface of the layer. The other side or surface of the layer may be uncoated with any conductive ink, and therefore be generally insulative. The ink may be painted, sprayed, or otherwise applied to the layer. Some embodiments have a moisture proof layer or coating 72 applied over the layer and the ink. The moisture proof layer 72 may be a 45 micrometer thick polyethylene (PE) coating. The coating 72 serves to protect the paper and the ink from humidity in the air stream 34.

In one example, the moisture proof coating 72 is at least 41 micrometers thick, which allows for electrostatic forces for particle precipitation and preventing humidity from reaching the layer or the ink. In another example, the moisture proof coating 72 is at least 20 micrometers thick.

The ink strips 64 and 68 being on opposing edges of the layer provide enlarged spacing between the conductive strips which additionally spaces the electrical forces and fields provide by the conductive ink. This may provide increased precipitation of any particles in the ambient air, and reduce the possibility of electrical interference between the conductive inks 64, 68. Therefore the ink is directly adjacent to and in contact with the edge of the layer 62, 66.

Figure 6:
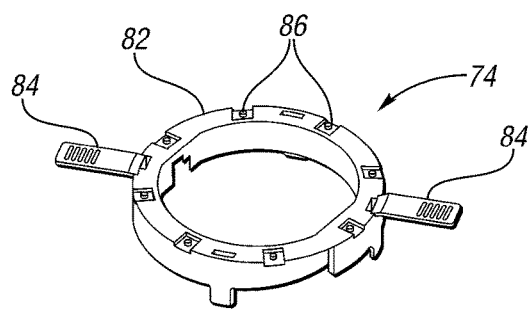
FIG. 6 is a perspective view of an upper filter core for use with the electrostatic precipitator of FIG. 5.
Figure 7:
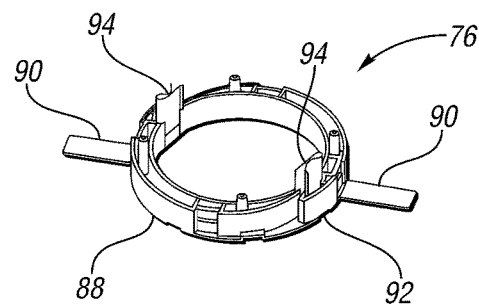
FIG. 7 is a perspective view of a lower filter core for use with the electrostatic precipitator of FIG. 5.

The spiral 70 is positioned and retained to the precipitator 38 using an upper filter core 74 as shown in FIG. 6, a lower filter core 76, as shown in FIG. 7, and several long combs 78 and short combs 80, as shown in FIG. 5.

Figure 9:
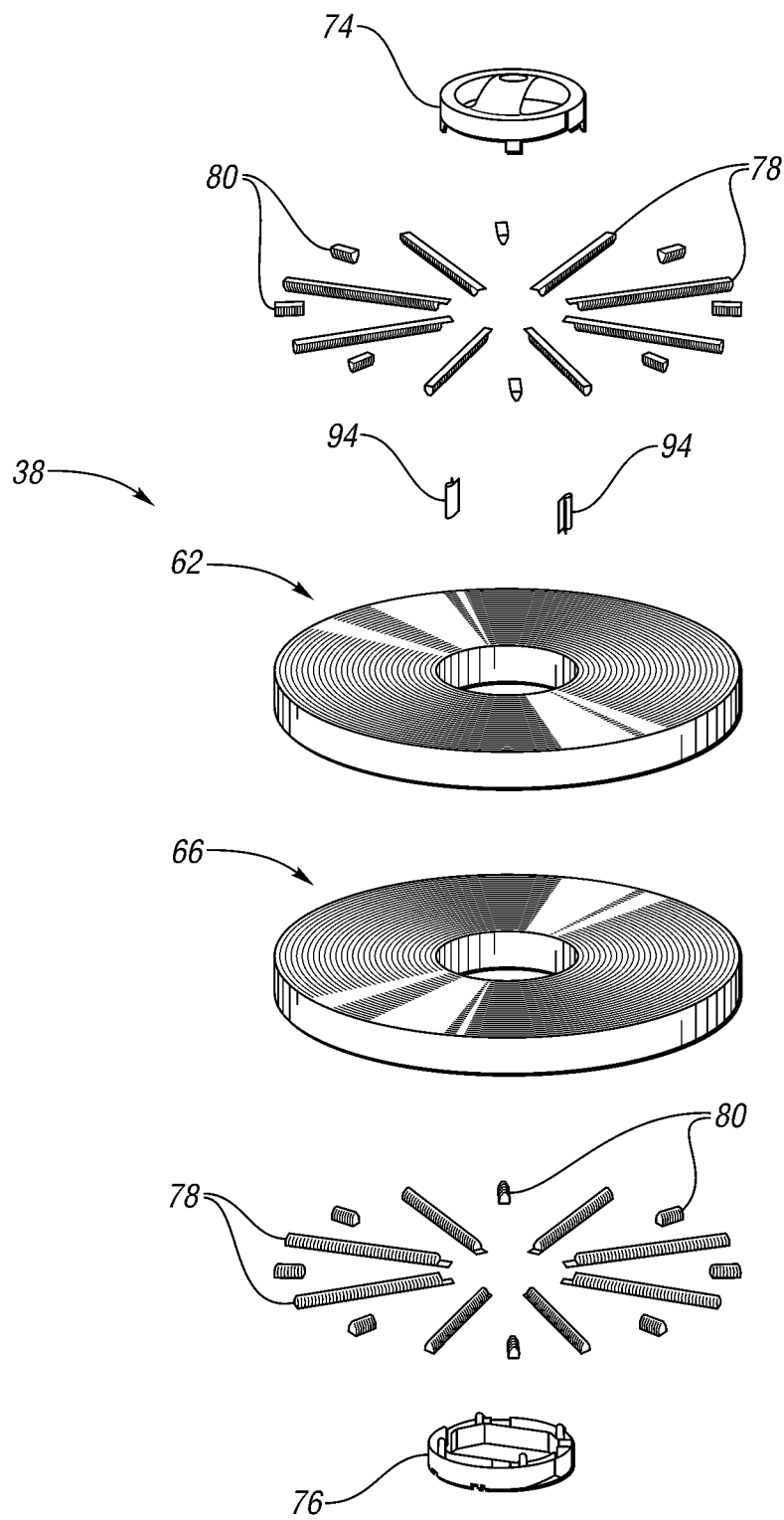
FIG. 9 is an exploded view of the electrostatic precipitator of FIG. 5.

The upper filter core 74 is shown in FIG. 6 with a generally cylindrical structure 82. In one embodiment, the upper filter core 74 also has a pair of flange members 84 extending from the cylindrical structure 82. In other embodiments, the flange members 84 are not present, as shown in FIG. 9. A series of mounting points 86 are formed into the cylindrical member 82 to attach the combs 78. The flange members 84 act to align the layers in the spiral 70.

The lower filter core 76, as shown in FIG. 7, has a generally cylindrical structure 88. In one embodiment, a pair of flange members 90 extend from the generally cylindrical structure 88 and serve to align the layers in the spiral. In other embodiments, the flange members 90 are not present in the lower filter core, as shown in FIG. 9. The lower filter core 76 has a series of mounting points 92 for combs 78.

The lower filter core 76 additionally has a pair of electrical contacts 94 for transmitting electricity to the conductive ink in the spiral 70. Of course, the electrical contacts 94 may be located on the upper filter core 74 or alternatively one metal contact may be located on the upper filter core and the other metal contact located on the lower filter core 76. The pair of electrical contacts 94 includes a positive contact and a negative or ground contact. One of the electrical contacts 94 transmits electricity between the high voltage power supply 54 and the first layer 64. The other electrical contact 94 transmits electricity between the high voltage power supply 54 and the second layer 66. This creates an opposing electrical charge on the two stripes of conductive ink 64, 68. The electrical contacts 94 may be the clips used to retain the precipitator to the support member 42 and cooperate with corresponding clips on the support member 42 to transmit electricity.

For example, the upstream stripe of ink is charged, which charges any particles in the air stream 34. The downstream stripe of ink is grounded, attracts the charged particles by exerting an electrostatic force on them, and causes the particles to precipitate or deposit onto the downstream stripe of ink. The particles may have been previously charged by the ionizer 55 upstream of the precipitator 38.

The upper and lower filter cores 74, 76 may snap, or clip, or otherwise attach to one another, thereby retaining the spiral 70. A handle 96 attaches to the upper filter core 74 to allow for handling of the precipitator 38. The handle 96, the upper filter core 74, and the lower filter core 76 may be made from a non-conductive material, such as a plastic, to prevent electrical shocks to a user during handling of the precipitator 38, and for ease of manufacturing.

An exploded view of the precipitator 38 is shown in FIG. 9. The first layer 62 and second layer 66 are wound into a spiral shape together such that they are nested and concentric. The electrical contacts 94 provide electricity to the conductive ink on the layers.

The first series of combs 78 and second series of combs 80 act to separate the layers 62, 66 from one another and provide appropriate spacing between the layers 62, 66. The upper filter core 74 and lower filter core 76 act as a retainer for the precipitator unit 38 and provide mounting points for the combs 78 and the electrical contacts 94.

Figure 10:
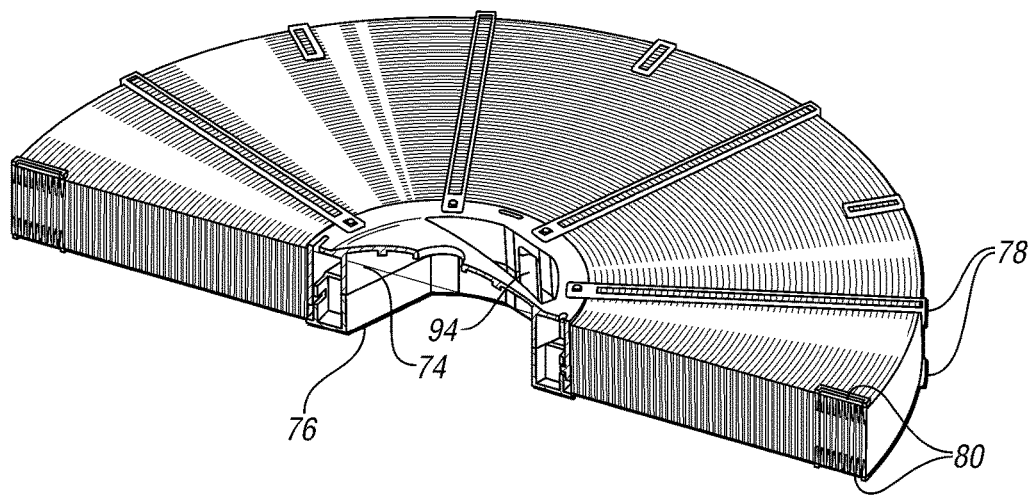
FIG. 10 is a cross-sectional perspective view of the electrostatic precipitator of FIG. 5.

FIG. 10 illustrates a cross sectional perspective view of the precipitator filter 38 depicting the cross section of the small combs 80. The small combs 80 are used for the wider diameter portion of the precipitator filter 38, such that a layer is not unsupported or unseparated by a comb for an extended length. A pair of combs 80 is provided on either side of the spiral 70 and across from one another.

Figure 11:
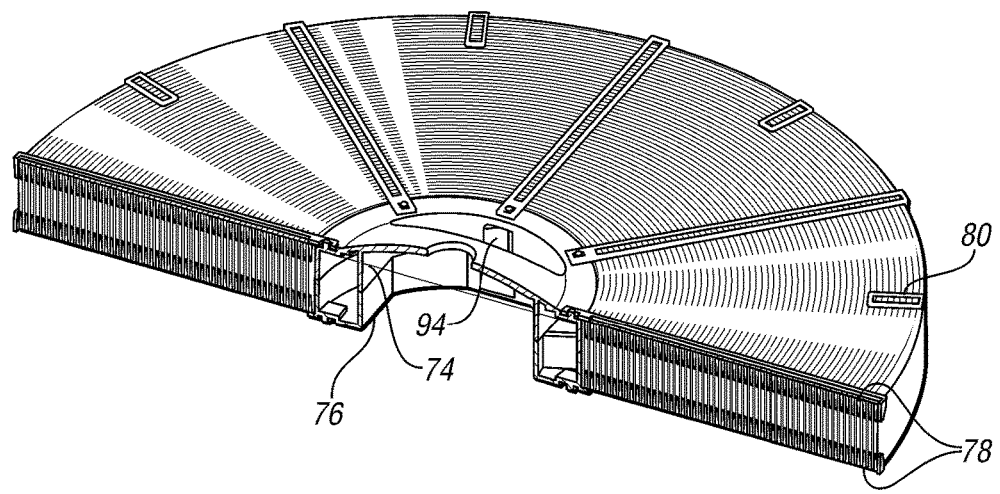
FIG. 11 is another cross-sectional perspective view of the electrostatic precipitator of FIG. 5.

FIG. 11 illustrates a cross sectional perspective view of the precipitator filter 38 showing a cross section of the combs 78. The combs 78 extend the width of the radial direction of the spiral 70. A pair of combs 78 is provided such that there is a comb 78 on either side of the spiral 70 across from one another. A pair of combs 78 is located at multiple positions around the precipitator unit 38, and directly opposed to one another. The combs 78 act to provide mechanical spacing and separation between the layers 62, 66 such that they do not come into contact with one another to cause an electrical short, and such that the spacing is appropriate to create electrostatic forces which provide deposition of the particles in the air stream 34.

The combs 78 are shown in FIGS. 12-14. The comb 78 has a support bar 98 that extends the length of the comb 78. Extending from the support bar 98 is a series of teeth 100. As shown in FIGS. 11 and 13, the teeth 100 are generally triangular and are tapered towards the free ends of the teeth 100. Of course, other shapes for the teeth 100 are also contemplated. An aperture 102 cooperates with the mounting points 86 of the upper filter core 74 or the mounting points 92 of the lower filter core 76 to attach the combs 78.

In one embodiment, the total length of the comb is 108 millimeters, the length with teeth is 100 millimeters, the width of the comb is 6 millimeters, and the length of the teeth (or thickness of the comb) is 8 millimeters. Of course, other sizes are envisioned for use with the unit 20.

The combs 80 are illustrated in FIGS. 15-17. The teeth 104 extend the length of the comb 80 and are supported by a support bar 106. In one embodiment, the length of the comb 80 is 17.5 millimeters, the width of the comb is 6 millimeters, and the length of the tooth (Original) thickness of the comb) is 8 millimeters. Of course, other dimensions for the comb 80 are envisioned for use with the unit 20. The teeth on the comb may be sized such that they extend to an intermediate region of a layer, and are less than the width of the layer.

Various embodiments of the present disclosure have associated non-limiting advantages. For example, the combs provide for mechanical separation between electrostatic layers in the electrostatic precipitator. The combs also provide for fixed spacing between the layers of the electrostatic precipitator, which in turn may provide for improved collection of particles with more uniform electrical forces on air flowing between the layers and through the precipitator. The combs provide for consistent and precise spacing between the strips. The fixed spacing may also provide more uniform air flow through the precipitator and reduce turbulence. Also, the combs may provide for ease of manufacture as the teeth may be inserted between the layers, opposed to an adhesive method where the layers need to be appropriately spaced and kept in that position while the adhesive is applied and sets. The conductive ink being on opposed edges of adjacent layers may provide for increased distance between the electrical fields generated by the conductive ink, and improved control over the electrical fields and reduced interference between the fields generated by the conductive ink on the two layers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrostatic precipitator for an air purifier comprising:
    a first spiral strip having a first continuous conductive electrode;
    a second spiral strip having a second continuous conductive electrode and nested with the first spiral strip; and
    a plurality of combs, each comb of the plurality of the combs extending from an outer periphery of the electrostatic precipitator to an intermediate region between the outer periphery and a center of the electrostatic precipitator
    wherein a width of the first continuous conductive electrode is less than a width of the first spiral strip, the first continuous conductive electrode provided directly adjacent to an edge of the first spiral strip on a first side of the electrostatic precipitator; and
    wherein a width of the second continuous conductive electrode is less than a width of the second spiral strip, the second continuous conductive electrode provided directly adjacent to an edge of the second spiral strip on a second side of the electrostatic precipitator, the second side opposed to the first side.

2. The electrostatic precipitator of claim 1 further comprising:
    a core, the first and second spiral strips in electrical communication with the core and extending radially outwardly therefrom.

3. The electrostatic precipitator of claim 1 wherein each comb of the plurality of combs extends radially inwards from the outer periphery, each comb of the plurality of combs having a support bar and a series of teeth separating adjacent first and second spiral strips.

4. The electrostatic precipitator of claim 3 wherein a length of each tooth of the series of teeth is sized to be less than a width of each of the first and second spiral strips.

5. The electrostatic precipitator of claim 3 wherein the series of teeth are configured to provide fixed, equal spacing between adjacent strips.

6. The electrostatic precipitator of claim 3 wherein each tooth of the series of teeth is generally triangular and tapered towards a free end of each tooth of the series of teeth.

7. The electrostatic precipitator of claim 3 wherein
    a first portion of the plurality of combs are positioned on the first side of the electrostatic precipitator and a second portion of the plurality of combs are positioned on the second side of the electrostatic precipitator, the first portion of the plurality of combs directly opposed to the second portion of the plurality of combs.

8. The electrostatic precipitator of claim 2 wherein the core has a central opening and a handle extending across the central opening.

9. The electrostatic precipitator of claim 2 wherein the core comprises an upper support core and a lower support core.

10. The electrostatic precipitator of claim 9 wherein the upper support core has an upper pair of flange members and the lower support core has a lower pair of flange members, the upper and lower pairs of flange members adapted to align edges of the first and second spiral strips.

11. The electrostatic precipitator of claim 2 wherein the plurality of combs is a first plurality of combs, the electrostatic precipitator further comprising:

a second plurality of combs, each comb of the second plurality of combs extending from the core to the outer periphery of the electrostatic precipitator.

12. The electrostatic precipitator of claim 11 wherein the core has a generally cylindrical structure defining a series of mounting points, each mounting point of the series of mounting points adapted to receive one of the second plurality of combs.

13. The electrostatic precipitator of claim 11 wherein each comb of the second plurality of combs is supported by the core and extends radially outwards therefrom; and
    wherein each comb of the first plurality of combs has a support bar and a series of teeth separating adjacent first and second strips.

14. The electrostatic precipitator of claim 13 wherein each comb of the second plurality of combs has a support bar and a series of teeth separating adjacent first and second strips; and
    wherein a length of the support bar of each comb in the second plurality of combs is greater than a length of the support bar of each comb in the first plurality of combs.

15. The electrostatic precipitator of claim 11 wherein the second plurality of combs is interposed with the first plurality of combs.

16. The electrostatic precipitator of claim 1 wherein pairs of combs in the plurality of combs are provided on opposed sides of the first and second spiral strips such that combs in each pair of combs are directly opposed from one another.

17. An electrostatic precipitator for an air purifier comprising:
    a central support core;
    a filter supported by and surrounding the central support core, the filter providing an outer periphery of the electrostatic precipitator, the filter having a first spiral strip with a continuous conductive electrode and a second spiral strip having a continuous conductive electrode and nested with the first spiral strip; and
    a first series of combs extending radially outward from the central support core to the outer periphery and positioned on one of a first and second side of the filter; and
    a second series of combs extending radially outward from an intermediate region of the filter to the outer periphery and positioned on one of the first and second side of the filter, the intermediate region of the filter being positioned radially between and spaced apart from the central support core and the outer periphery;
    wherein each comb of the second series of combs is positioned between adjacent combs of the first series of combs;
    wherein a width of the continuous conductive electrode of the first spiral strip is less than a width of the first spiral strip, the continuous conductive electrode of the first spiral strip provided directly adjacent to an edge of the first spiral strip on a first side of the electrostatic precipitator; and
    wherein a width of the continuous conductive electrode of the second spiral strip is less than a width of the second spiral strip, the continuous conductive electrode of the second spiral strip provided directly adjacent to an edge of the second spiral strip on a second side of the electrostatic precipitator, the second side opposed to the first side.

18. The electrostatic precipitator of claim 17 wherein the first and second series of combs are positioned on the first side of the electrostatic precipitator, the electrostatic precipitator further comprising:
    a third series of combs extending radially outward from the central support core to the outer periphery and positioned on the second side of the filter, each comb in the third series of combs directly opposed to a corresponding comb in the first series of combs; and
    a fourth series of combs extending radially outward from an intermediate region of the filter to the outer periphery and positioned on the second side of the filter, each comb of the fourth series of combs directly opposed to a corresponding comb in the second series of combs.

19. The electrostatic precipitator of claim 17 wherein the central support core has a tubular structure having an inner surface and an outer surface; and
    wherein the central support core has first and second electrical contacts on the inner surface of the central support core, the first and second electrical contacts in electrical communication with the continuous conductive electrodes of the first and second spiral strips respectively, the first and second electrical contacts configured to be in electrical contact with corresponding contacts on an air purifier device.

* * * * *